United States Patent
Dahringer et al.

(10) Patent No.: US 8,389,426 B2
(45) Date of Patent: Mar. 5, 2013

(54) BICOMPONENT FIBER

(75) Inventors: Jörg Dahringer, Bobingen (DE); Bernd Blech, Bobingen (DE); Werner Stefani, Großaitingen (DE); Werner Grasser, Stadtbergen (DE); Mehmet Demirors, Pearland, TX (US); Gert Claasen, Richterswill (CH)

(73) Assignee: Trevira GmbH, Bobingen (DE)

( * ) Notice: Subject to any disclaimer, the term of this patent is extended or adjusted under 35 U.S.C. 154(b) by 363 days.

(21) Appl. No.: 12/651,628

(22) Filed: Jan. 4, 2010

(65) Prior Publication Data

US 2011/0165470 A1    Jul. 7, 2011

(51) Int. Cl.
  *D04H 1/00*  (2006.01)
  *D04H 5/00*  (2012.01)
  *D02G 3/04*  (2006.01)

(52) U.S. Cl. ........ 442/361; 442/362; 442/363; 442/364; 428/373; 428/374

(58) Field of Classification Search .......... 442/361–364, 442/373, 374; 428/373, 374; 526/65, 227, 526/228, 348
See application file for complete search history.

(56) References Cited

U.S. PATENT DOCUMENTS

| | | | | |
|---|---|---|---|---|
| 3,243,418 | A | * | 3/1966 | Shouse et al. ........ 526/227 |
| 3,842,060 | A | * | 10/1974 | McDonald ........ 526/64 |
| 5,009,951 | A | * | 4/1991 | Ohmae et al. ........ 442/364 |
| 5,948,529 | A | | 9/1999 | Hastie |
| 2003/0003826 | A1 | | 1/2003 | Rudisill et al. |
| 2004/0132376 | A1 | | 7/2004 | Haworth |
| 2005/0020172 | A1 | | 1/2005 | Bansal et al. |
| 2006/0135026 | A1 | * | 6/2006 | Arendt et al. ........ 442/400 |
| 2006/0199931 | A1 | * | 9/2006 | Poon et al. ........ 526/346 |

FOREIGN PATENT DOCUMENTS

| | | |
|---|---|---|
| EP | 0154197 A2 | 9/1985 |
| EP | 1057916 A1 | 12/2000 |
| JP | 2-182960 | 7/1990 |
| JP | 5-263353 | 10/1993 |

OTHER PUBLICATIONS

Dahringer, J., et al., "Trevira Bicomponent Fibers for Airlaid Nonwovens," Chemical Fibers International, IBP Press (Frankfurt am Main, Germany), (vol. 49), (Issue. 5), (p. 440-441), (Oct. 1, 1999).

* cited by examiner

*Primary Examiner* — Jennifer A Steele
(74) *Attorney, Agent, or Firm* — Hammer & Associates, P.C.

(57) ABSTRACT

The present invention relates to a new bicomponent fiber, a nonwoven fabric comprising said new bicomponent fiber and sanitary articles made therefrom. The bicomponent fiber contains a polyethylene-based resin forming at least part of the surface of the fiber longitudinally continuously and is characterized by a Co-monomer Distribution Constant greater than about 45, a recrystallization temperature between 85° C. and 110° C., a tan delta value at 0.1 rad/sec from about 15 to 50, and a complex viscosity at 0.1 rad/second of 1400 Pa.sec or less. The nonwoven fabric comprising the new bicomponent fiber according to the instant invention are not only excellent in softness, but also high in strength, and can be produced in commercial volumes at lower costs due to higher thoughputs and requiring less energy.

37 Claims, 1 Drawing Sheet

BICOMPONENT FIBER

BACKGROUND OF THE INVENTION

The present invention relates to a new bicomponent fiber, a nonwoven fabric comprising said new bicomponent fiber and sanitary articles made therefrom. The nonwoven fabric comprising the new bicomponent fiber according to the instant invention are not only excellent in softness, but also high in strength, and can be produced in commercial volumes at lower costs due to higher thoughputs and requiring less energy.

Nonwoven fabrics, such as spunbonded nonwoven fabrics and Nonwoven fabrics manufactured using carding, melt-blowing or airlaid techniques have been used in a wide variety of applications recent years, also for sanitary articles made therefrom.

A polyethylene nonwoven fabric, which resin fibers are formed of polyethylene, is known for its softness and good touch (EP-A-0,154,197). Polyethylene fibers are, however, difficult to spin, and hence difficult to allow to have a fine denier which are required for obtaining a good softness of a fabric. Nonwoven fabric formed of polyethylene fibers easily melts when subjected to heat/pressure treatment with a calender roll, and what is even worse, it easily winds itself around the roll due to low strength of the fibers. Measures have been taken against the above problems in which the treatment temperature is decreased; however, in such a case, thermal adhesion is apt to be insufficient, which leads to another problem of being unable to obtain nonwoven fabric with sufficient strength and fastness to rubbing. In actuality, a polyethylene nonwoven fabric is inferior to a polypropylene nonwoven fabric in strength.

In order to solve the above mentioned problems, there have been proposed techniques of utilizing a core-sheath-type bicomponent fiber using a resin of polypropylene, polyester, etc., as a core, and polyethylene as a sheath (Japanese Patent Laid-Open No. 2-182960 and Japanese Patent Laid-Open No. 5-263353).

However, nonwoven fabrics, which are formed of core-sheath-type bicomponent fibers, as described above, have not had both softness and strength adequate to be used as sanitary materials. Specifically, when increasing the amount of polyethylene as a constituent of sheath, the softness of the nonwoven fabric is enhanced, but its strength is not allowed to be sufficient, as a result of which it is likely to fracture during the process. On the other hand, when increasing the constituent of core, the nonwoven fabric is allowed to have sufficient strength, but is poor in softness and its quality, as a material for sanitary goods, decreases. Thus it has been difficult to obtain a nonwoven fabric having both of the above performances on a satisfactory level.

Many of these core-sheath-type bicomponent fibers comprise a polyethylene sheath with a polyester or polypropylene core. The incumbent polyethylenes typically used in such applications have recrystallization temperatures which are generally greater than 110° C.

A first solution to the aforementioned problem is disclosed in EP-A-1,057,916 which describes spunbonded nonwoven fabrics for disposable sanitary articles made from conjugated fibers. Such conjugated fibers having a high melt core and low melt sheath material can be of side-by-side type. The low melt material proposed is a polyethylene based resin having a first high melting point in the range of 120 to 135° C. and a second low melting point in the range from 90 to 125° C., the melting point of the second low melting material being at least 5° C. below the first high melting point. Such low melt polyethylene based resins are rather complex to make and cause problems during fiber spinning and later use of such conjugated fibers in the production of Nonwoven, in particular for Nonwoven fabrics manufactured using carding, melt-blowing or airlaid techniques.

However, it still would be desirable to lower the melting point of the polyethylene in order to allow faster line speeds due to lower binding temperature and lower energy usage. On the other hand, lowering the melting point of the polyethylene is associated with significant processing problems during fiber spinning. For widespread applicability for use in binder fibers, such fiber should have the following characteristics: good spinning performance, such that smoke, fiber breaks and fibers sticking together are minimized during the spinning process; the fibers also need to have a low COF to allow the ability to be texturized; good fiber tensile properties; ability to be readily cut; ability to be used in the airlaid process and ability to be bonded using the thermal air bonding process at the lowest temperature without fibers becoming sticky. Additionally, the outer layer of the bi-component fiber should have good bonding to the inner core (substrate) as well as to other fibrous products.

SUMMARY OF THE INVENTION

Accordingly, the object of the present invention is to solve the aforementioned problem, in particular, to provide a bicomponent fiber which provides a nonwoven fabric with excellent softness and touch as well as with sufficient strength and which can be produced on existing commercial equipment at lower costs.

The subject matter of the instant invention is directed to a bicomponent fiber composed of a polyethylene-based resin (A) and a high-melting point resin (B) whose melting point is higher than that of the above polyethylene-based resin (A) by at least 10° C., the component ratio by weight of the polyethylene-based resin (A) to the high-melting point resin (B) being in the range of 50/50 to 10/90, and the polyethylene-based resin (A) forming at least part of the surface of the fiber longitudinally continuously wherein the polyethylene-based resin (A) is characterized by a Co-monomer Distribution Constant greater than about 45, a recrystallization temperature between 85° C. and 110° C., a tan delta value at 0.1 rad/sec from about 15 to 50, and a complex viscosity at 0.1 rad/second of 1400 Pa.sec or less.

Further subjects of the instant invention are Nonwoven fabrics comprising bicomponent fibers as described above. Preferably such Nonwoven fabrics comprise the bicomponent fibers according to the instant invention as texturized crimped fiber and/or non-texturized flat fibers. Further, such Nonwoven comprises the aforementioned bicomponent fibers as staple fiber and/or continuous filament fiber.

Preferred Nonwoven fabrics are (i) wet-laid Nonwoven, (ii) air-laid Nonwoven and (iii) carded Nonwoven.

Another subject of the instant invention is a sanitary article comprising the Nonwoven fabrics according to the instant invention.

DESCRIPTION OF THE INVENTION

Definitions

The term "composition" as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "long chain branched polymer" refers to polymers where polymer backbone of the polymer contains branches that are longer than the typically used co-monomers (for example longer than 6 or 8 carbon atoms). A long chain branched polymer typically contains more than 0.2 long chain branches per 1000 carbon atoms.

The term "linear" refers to polymers where the polymer backbone of the polymer lacks measurable or demonstrable long chain branches, for example, the polymer can be substituted with an average of less than 0.01 long branch per 1000 carbons. The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one co-monomer.

Bicomponent Fiber

The bicomponent fiber of the instant invention can be of any shape and is not limited to a particular shape. However, preferred are core-sheath-type bicomponent fibers and side-by-side-type bicomponent fibers.

Resin (A) Polyethylene-Based

The bicomponent fiber of the instant invention contains a polyethylene-based resin (A) which has a Co-monomer Distribution Constant greater than about 45, a recrystallization temperature between 85° C. and 110° C., a tan delta value at 0.1 rad/sec from about 15 to 50, and a complex viscosity at 0.1 rad/second of 1400 Pa.sec or less.

The ethylene-based polymer resin compositions can be further characterized as having a single differential scanning calorimetry (DSC) melting peak within the temperature range from 85° C. to 110° C.

The ethylene-based polymer resin compositions can be further characterized as having a Co-monomer Distribution Constant greater than about 45, more preferably greater than 50, most preferably greater than 55, and as high as 400, more preferably as high as 100. In particular preferred ethylene-based polymer resin compositions have a Co-monomer Distribution Constant in the range of 45 to 400, most preferred in the range of 50 to 100, at most preferred in the range of 55 to 100.

The ethylene-based polymer compositions are those made in high pressure reactors utilizing free radical polymerization process preferably using peroxide based free radical initiators The preferred polyethylene resins have a melt index (measured in accordance with ASTM D 1238, Condition 190° C./2.16 kg) in the range of from 5 to 25 g/10 min, more preferably 5 to 20.

Preferred ethylenic resins have a density in the range of from 0.910 to 0.930 g/cm$^3$, more preferably 0.915 to 0.925.

The ethylene based polymer compositions can also be characterized in having peak recrystallization temperature in the range of from 85° C. to 110° C., preferably from 90 to 105° C.

The ethylene based polymer compositions can also be characterized by having more than about 0.2 long chain branches/1000 carbons, preferably from about 0.2 to about 3 long chain branches/1000 carbons.

The ethylene based polymer compositions can also be characterized in having a complex viscosity at 0.1 rad/second of 1400 Pa.sec or less, and preferably at 100 rad/seconds of 500 Pa.sec or less. Most preferably, the resins of the present invention will have a complex viscosity at 0.1 rad/second in the range of 500 to 1200 and at 100 rad/seconds in the range of from 150 to 450 Pa.sec.

The preferred ethylene based polymer compositions can also be characterized in having a Tan delta value at 0.1 rad/sec from about 15 to 50, preferably 15 to 40.

In some processes for producing the polyethylene-based resin (A), processing aids, such as plasticizers, can also be included in the ethylene based polymers of the present invention. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex).

In some processes, ethylenic polymers are treated with one or more stabilizers, for example, antioxidants, such as IRGANOX 1010 and IRGAFOS 168 (Ciba Specialty Chemicals; Glattbrugg, Switzerland).

In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents surface modification and anti-blocking agents. The ethylenic polymer composition may, for example, comprise less than 10 percent by the combined weight of one or more additives, based on the weight of the embodiment ethylenic polymer.

The ethylenic polymer produced may further be compounded. In some ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer.

The polyethylene-based resin (A) can be made using two or more reactors, one of which is a back mixed reactor with at least one reaction zone and a second reactor which is a laminar flow reactor with at least two reactions zones. The product can also advantageously be made in a typical tubular high pressure process with two or more reaction zones with ethylene pressure at the inlet in the range of 1800 bars to 3500 bars. The pressure at the inlet of the first reaction zone can advantageously be in the range of from 2000 bars to 3000 bars. The start of polymerization temperature can be from 110° C. to 150° C. with the peak temperature from about 280° C. to 330° C. For the initiation of the reaction, a mixture of peroxides was used to achieve the desired reaction rate at a given temperature and pressure as is known in the art. The exact composition of the free radical peroxide initiator mixture can be determined based on the details of plant, process pressures, temperatures and residence times by those skilled in the art. For the production of the compositions of the present invention a mixture of tertiary butyl peroctoate and ditertiary butyl peroxide can advantageously be used in the first zone of the reactor in a ratio on the order of 14 to 3 based on volume. The same two peroxides can also used in the second reaction zone at a volume ratio of 1 to 1. The exact amounts will depend on the purity of reactors, the reactor characteristics and other process parameters and can be determined for each specific set up by those skilled in the art.

The second zone re-initiation temperature can be from about 160° C. to 230° C. with a peak temperature of from about 280° C. to 330° C. A mixture of methyl ethyl ketone and propylene can be used as chain transfer agent to control the molecular weight. The typical ranges can be from about 10 to 5000 volume ppm of methyl ethyl ketone and from about 0.1 volume % to 5 volume % propylene depending on the complex viscosity ranges desired Then the polymer was separated from process solvents and unreacted ethylene, palletized through an extruder and used without further processing.

Additives and adjuvants may also be added to the ethylenic polymer post-formation. Suitable additives include fillers, such as organic or inorganic particles, including clays, talc, titanium dioxide, zeolites, powdered metals, in particular based on silver and/or silver ions, superabsorber materials, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Resin (B) High-Melting Point Resin

The bicomponent fiber of the instant invention contains a high-melting point resin (B), typically forming the core portion of the core-shear-type bicomponent fiber according to the present invention. Such high-melting point resin (B) is a thermoplastic resin having a melting point higher than that of the above polyethylene-based resin (A) by at least 10° C., preferably at least 20° C., most preferably at least 30° C.

Preferred high-melting point resins (B) include polyolefin resins such as propylene-based polymers, polyester resins such as polyethylene terephthalate (PET) and polyamide resins such as nylon. Among all the above resins, polyester resins such as polyethylene terephthalate (PET), polybutylene terephthalate (PBT) polynaphthalene terephthalate (PEN) are most preferred.

Among the aforementioned propylene-based polymers, propylene homopolymer or copolymers of propylene and alpha-olefin, such as ethylene, 1-butene, 1-hexene, 4-methyl-1-pentene and 1-octene are most preferred. Among all the above copolymers, particularly preferable are propylene-ethylene random copolymer comprised of propylene and a small amount of ethylene whose ethylene-derived structural unit content is 0.1 to 5 mol %. The use of copolymer of this type provides good spinnability and productivity of their bicomponent fibers and a nonwoven fabric having good softness. The term "good spinnability" used herein means that neither yarn breaking nor filament fusing occurs during extrusion from spinning nozzles and during drawing.

Preferably the aforementioned propylene-based polymers have a melt flow rate (MFR; measured at 230° C. and at a load of 2.16 kg in accordance with ASTM D1238) in the range of 20 to 100 g/10 min in terms of obtaining a fiber particularly excellent in balance of spinnability and fiber strength.

Preferably the molecular weight distribution (Mw/Mn) of the aforementioned propylene-based polymers, when measuring by the gel permeation chromatography (GPC), is in the range of 2.0 to 4.0, and more preferably the Mw/Mn is in the range of 2.0 to 3.0 in terms of obtaining a bicomponent fiber good in spinnability and particularly excellent in fiber strength.

The core component may consist of preferably of conventional melt-spinnable polyester material. All known types suitable for fibre manufacture may be considered in principle as polyester material. Such polyesters consist essentially of components which derive from aromatic dicarbonic acids and from aliphatic diols. Commonly used aromatic dicarbonic acid components are the bivalent residues of benzol dicarbonic acids, particularly of terephthalic acid and isophthalic acid; commonly used diols have 2 to 4 C atoms, ethylene glycol being particularly suitable.

Of particular advantage is a polyester material at least 85 mol % of which consists of polyethylene terephthalate. The remaining 15 mol % are then composed of dicarbonic acid units and glycol units which act as so-called modifiers and which enable the expert to further influence the physical and chemical properties of the fibres produced in a specific manner. Examples of such dicarbonic acid units are residues of isophthalic acid or of aliphatic dicarbonic acid, e.g. glutaric acid, adipinic acid, sabacic acid; examples of diol residues with a modifying action are those of longer chain diols, e.g. of propane diol or butane diol, of di- or triethylene glycol or, if available in a small quantity, of polyglycol with a molecular weight of 500 to 2000 g/mol.

Particularly preferable are polyesters which contain at least 95 mol % of polyethylene terephthalate, particularly those of unmodified polyethylene terephthalate. Such polyesters normally have a molecular weight equivalent to an intrinsic viscosity (IV) of 0.5 to 1.4 (dl/g), measured on solutions in dichloroacetic acid at 25° C.

Additives

The polyethylene-based resin (A) forming the sheath portion of the fiber and/or the high-melting point resin (B) forming the core portion of the same, may be blended with additives, such as coloring material, thermoresistance stabilizer, lubricant, nucleating agent and other polymers according to the situation.

The coloring materials applicable to the present invention include, for example, inorganic coloring materials, such as titanium oxide and calcium carbonate, and organic coloring materials, such as phthalocyanine.

The thermoresistance stabilizers include, for example, phenol-based stabilizers such as BHT (2,6-di-t-butyl-4-methylphenol).

The lubricants include, for example, oleic amide, erucic amide and stearic amide. In the present invention, particularly preferably 0.1 to 0.5 wt. % of lubricant is blended with the polyethylene-based resin (A) forming the sheath portion, since the bicomponent fiber obtained in the above manner can have an enhanced fastness to rubbing.

Another group of additives are adhesion promoters which promote adhesion between the polyethylene-based resin (A) forming the sheath portion of the fiber and or the high-melting point resin (B). Suitable adhesion promoters are maleic acids (MSA) or maleic acid anhydride (MAH) which promote such adhesion. Typical amounts added are from 0.05 to 3% by weight. Most preferred the adhesion promoter is added to the polyethylene-based resin (A) in the melt during spinning of the bicomponent fiber Preferably the component ratio by weight of the polyethylene-based resin (A) to the high-melting point resin (B) is in the range of 50/50 to 10/90, and in terms of obtaining a fiber excellent in balance of softness and fastness to rubbing, preferably in the range of 50/50 to 20/80 and more preferably in the range of 40/60 to 30/70.

When the proportion of the polyethylene-based resin (A) to a bicomponent fiber exceeds 50, there may exist some parts not having been improved in fiber strength. On the other hand, when the proportion of the polyethylene-based resin (A) to a bicomponent fiber is as low as less than 10, there may exist some parts poor in both softness and touch in the obtained fabric.

The area ratio of the sheath portion to the core portion in a cross section of the core-sheath-type bicomponent fiber according to the present invention is generally almost the same as the component ratio by weight described above, and is in the range of 50/50 to 10/90, preferably in the range of 50/50 to 20/80, and more preferably in the range of 40/60 to 30/70.

The core-sheath-type bicomponent fiber according to the present invention may be a concentric type one where the circular core portion and the doughnut-shaped sheath portion have the same center in the same cross section of the fiber, the core portion being wrapped up in the sheath portion, or an eccentric type one where the centers of the core portion and the sheath portion are different from each other. In addition, the core-sheath-type bicomponent fiber may be an eccentric type one where the core portion is partially exposed on the surface of the fiber.

For core-sheath-type bicomponent fiber, preferably its fineness is from 0.7 to 20 dtex and in terms of obtaining a fiber more excellent in softness, more preferably from 0.9 to 15 dtex.

Bicomponent Fiber Production

Devices of prior art, with suitable nozzles, may be used for manufacturing bicomponent fiber according to the present invention.

Beside the common core-sheath bicomponent fibres with a core/sheath profile where the core occupies an eccentric position are also part of this invention. These so-called eccentric bicomponent fibres are described in more detail in US 2005/0093197 which forms a part of this specification with respect to such eccentric bicomponent design.

The spinning speed for forming the bicomponent fiber according to the present invention is typically between 600 and 2,000, preferably between 800 and 1,500 m/min.

The escape speed on the nozzle escape surface is matched to the spinning speed and the drawing ratio so that the fiber finally produced has a titre in the range 0.7 to 20 dtex, preferably from 0.9 to 15 dtex.

The raw materials used for manufacturing the bicomponent fiber according to the present invention are independently melted in extruder, etc., and each molten is extruded through a spinneret with bi-component fiber spinning nozzles constructed to extrude the molten in such a manner as to form a desired structure, e.g. core-sheath, so that the bicomponent fiber is spun out.

The spun bicomponent fiber is then cooled with a cooling fluid, allowed to receive a tensile force by drawing air to have a predetermined fineness as defined above.

For producing spunbonded Nonwoven fabrics, the fresh spun bicomponent fiber according to the present invention are collected on a collecting belt to deposit thereon to a predetermined thickness, so that the spunbonded Nonwoven of the bicomponent fiber can be obtained. The spunbonded bicomponent fiber nonwoven fabric can be consolidated further, e.g. by subjecting the Nonwoven to further entangling, for example, by the hot embossing process using an embossing roll or by known needling/hydro entanglement methods.

For producing other Nonwoven, such as wet-laid Nonwoven, air-laid Nonwoven and carded Nonwoven, further treatment of the fresh spun bicomponent fiber is required.

Bicomponent Fiber Treatment after Spinning

For producing Nonwoven fabric, such as wet-laid Nonwoven, air-laid Nonwoven and carded Nonwoven, further treatments are required after spinning.

The bicomponent fiber according to the present invention are typically drawn with individually different ratios of between 1.2 and 4.0, the drawing ratios varying by approx. 0.1, i.e. they are 1.2, 1.3; 1.4 . . . to 4.0. The total drawing ratio resulting is between 1.2 and 4.0.

The drawing of the bicomponent fiber takes place at the same temperature or different temperature of between 40 and 70° C., preferably at 55° C.

Thereafter, the drawn bicomponent fiber can be crimped, typically in a stuffer box.

After crimping in the stuffer box the bicomponent fibres are subjected to heat treatment at up to 100° C., with a holding time from 3 to 20 minutes, most preferred from 12 to 15 minutes.

The degree of crimping can be improved using eccentric bicomponent fibers as described above.

Typically, the degree of crimping is expressed as crimp contraction (K1) which is calculated using the Equation $$K1 = (\text{decrimped length} - \text{crimped length}) / \text{decrimped length [standard climate, 20° C.} \pm 2° \text{C., 60-65\% relative air humidity]}$$

The number of crimps is typically given as crimps/cm.

The bicomponent fibres either texturized or not can be cut into staple fibres, then processed into suitable products. Typical staple fiber length are from 0.2 cm to 15 cm, preferably from 0.2 cm to 8 cm, most preferred from 0.3 cm to 6 cm.

For use in wet-laid Nonwoven fabric, the bicomponent fiber according to the instant invention typically is a non-texturized flat fiber not being texturized after spinning. Preferably such flat fibers have a length of from 0.2 cm to 3 cm, most preferred from 0.3 cm to 2.5 cm.

For use in air-laid Nonwoven fabric the bicomponent fiber according to the instant invention typically is a texturized fiber. Preferably the crimp contraction (K1) is from 3 to 7% and the number of crimps is from 3 to 6 crimps/cm For use in carded Nonwoven fabric the bicomponent fiber according to the instant invention typically is a texturized fiber. Preferably the crimp contraction (K1) is from 8 to 15% and the number of crimps is from 5 to 8 crimps/cm Thereafter, the bicomponent fibers can be processed into suitable products, in particular textile products, preferably hygiene products, hygiene textile fabrics, hygiene non-woven fabrics, nappies, towels or liners and the like, but also into cotton wool buds etc.

As a result of choosing an eccentric core-sheath design such bicomponent fibres are given an additional latent crimp which, during further processing, can be initiated by heat treatment at temperatures exceeding approx. 100° C.

Bicomponent Fiber Nonwoven Fabric

Further subjects of the instant invention are Nonwoven fabrics comprising bicomponent fibers as described above.

Due to the nature of the polyethylene-based resin (A) forming at least part of the surface of the fiber longitudinally continuously wherein the polyethylene-based resin (A) is characterized by a Co-monomer Distribution Constant greater than about 45, a recrystallization temperature between 85° C. and 110° C., a tan delta value at 0.1 rad/sec from about 15 to 50, and a complex viscosity at 0.1 rad/second of 1400 Pa.sec or less, the processing of the Nonwoven fabrics can significantly improved.

The specific polyethylene-based resin (A) allows processing temperature when forming the Nonwoven and later thereto-bonding. Due to the lower melting point of the polyethylene-based resin (A) which is below 120° C., lower binding temperature and lower energy usage is required. In addition, faster line speeds are possible resulting in lower production costs. Despite the lower melting point, no significant processing problems occur during fiber spinning. These and other advantages occur for example when the bicomponent fiber according to the instant invention is used in Nonwoven combined with cellulose based fibers which are extremely heat sensitive. Even a small reduction of the processing/thermo-bonding temperature can be of significant commercial advantage, due to high volumes. In addition, the risk of potential fire is reduced too. Further, a potential heat damage of other materials blended with the bicomponent fiber according to the instant invention can be lowered or even avoided.

Preferred Nonwoven fabrics are (i) wet-laid Nonwoven, (ii) air-laid Nonwoven and (iii) carded Nonwoven.

The Nonwoven fabrics according to the instant invention can be blended with other fibrous materials.

Preferably, the Nonwoven fabrics according to the instant invention have a basis weight from 10 to 500 g/m². The aforementioned basis weight depends of the later use.

Preferably, the Nonwoven fabrics according to the instant invention comprises the bicomponent fibres either texturized or not and cut into staple fibres, preferably having a staple fiber length from 0.2 cm to 15 cm, more preferred from 0.2 cm to 8 cm, most preferred from 0.3 cm to 6 cm.

Preferably, the Nonwoven fabric according to the instant invention is a wet-laid Nonwoven fabric comprising the bicomponent fiber according to the instant invention typically, said bicomponent fiber being a non-texturized flat fiber, preferably having a length of from 0.2 cm to 3 cm, most preferred from 0.3 cm to 2.5 cm.

Preferably, the Nonwoven fabric according to the instant invention is an air-laid Nonwoven fabric comprising the bicomponent fiber according to the instant invention typically, said bicomponent fiber being texturized, preferably having a crimp contraction (K1) from 3 to 7% and the number of crimps from 3 to 6 crimps/cm, preferably having a length of from 0.2 cm to 3 cm, most preferred from 0.3 cm to 2.5 cm.

Preferably, the Nonwoven fabric according to the instant invention is a carded Nonwoven fabric comprising the bicomponent fiber according to the instant invention typically, said bicomponent fiber being texturized, preferably having a crimp contraction (K1) from 8 to 15o and the number of crimps from 5 to 8 crimps/cm, preferably having a length of from 2 cm to 15 cm, most preferred from 3 cm to 8 cm.

In addition, the Nonwoven according to the instant invention can be a spunbonded Nonwoven comprising continuous filaments or non-continuous fibers, both of the bicomponent type composed of the above polyethylene-based resin (A) and high-melting point resin (B).

The formation of the Nonwoven fabric according to the instant invention can be made using existing techniques.

The Nonwoven fabrics according to the instant invention can be blended with other fibrous and/or particle materials, depending on the intended use.

For industrial applications, the Nonwoven fabrics according to the instant invention comprise other fibrous materials, such as organic and/or inorganic fibrous materials, which may be recycling materials as well.

The term organic fibrous material comprises beside organic polymer resins also natural fibrous materials. Within the organic polymer resins, all melt-spinnable materials can be used. A particular preference to melt-spinnable organic polymers such as polyolefins, e.g. polyethylene and/or polypropylene, polyesters, e.g. polyethylene terephthalate (PET), polybutylene terephthalate (PBT) polynaphthalene terephthalate (PEN), polytrimethylene terephthalat (PTT), polyimide, e.g. nylon, is given.

For industrial applications, the Nonwoven fabrics according to the instant invention comprise particle materials, such as inorganic particle materials, in particular grinding materials.

The term inorganic fibrous material comprises—beside others—those based on glass and/or minerals, in particular recycled materials.

Industrial applications are filter media or battery separators.

For textile applications, preferably hygiene and/or sanitary products, the Nonwoven fabrics according to the instant invention comprise other fibrous materials. Preferred fibrous materials are pulp, cellulose, cotton, homo- and copolymers based on polyethylene or polypropylene, in particular based on recycled materials.

Thereafter, the Nonwoven fabrics according to the instant invention can be processed into suitable products or processed to form an integral part of these products, in particular textile products, preferably hygiene products, hygiene textile fabrics, hygiene non-woven fabrics, disposable diaper, sanitary napkin, nappies, towels or liners and the like, but also into cotton wool buds etc.

For some textile applications, the Nonwoven fabrics according to the instant invention in addition to the other fibrous materials can comprise particle materials, such as super absorber materials, inter alia used in disposable diapers.

The Nonwoven fabrics according to the instant invention can be combined with other cover or facing layers to provide an even softer touch. Suitable cover or facing layers are melt-blown nonwoven fabrics formed from fibers having 1 to 10 μm of diameter.

Test Methods
Density:

Samples that are measured for density are prepared according to ASTM D 1928. Measurements are made within one hour of sample pressing using ASTM D792, Method B.

Melt Index:

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity:

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3 to 10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to –40° C. at a 10° C./minute cooling rate and held isothermal at –40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to –20° C. The heat curve is analyzed by setting baseline endpoints from –20° C. to the end of melt. The values determined are peak melting temperature ($T_m$), peak recrystallization temperature ($T_c$), heat of fusion ($H_f$) (in Joules per gram), and the calculated % crystallinity for polyethylene samples using Equation 2:

% Crystallinity=$((H_f)/(292 \text{ J/g}))\times 100$  (Eq. 2).

The heat of fusion (Hf) and the peak melting temperature are reported from the second heat curve. Peak recrystallization temperature is determined from the cooling curve as $T_p$.

Dynamic Mechanical Spectroscopy (DMS) Frequency Sweep:

Melt rheology, constant temperature frequency sweeps, were performed using a TA Instruments ARES rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity ($\eta^*$) were calculated.

CEF Method:

Co-monomer distribution analysis is performed with Crystallization Elution Fractionation (CEF) (PolymerChar in Spain) (B. Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl.

The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 um±6% (MO-SCI Specialty Products) with ⅛ inch stainless tubing. Glass beads are acid washed by MO-SCI Specialty with the request from the Dow Chemical Company. Column volume is 206 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≧97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %.

The CEF column resolution is defined as:

$$\text{Resolution} = \frac{\text{Peak temperature of } NIST1475a - \text{Peak Temperature of Hexacontane}}{\text{Half-height Width of } NIST1475a + \text{Half-height Width of Hexacontane}}$$

The column resolution is 6.0

CDC Method:

Co-monomer distribution constant (CDC) is calculated from co-monomer distribution profile by CEF. CDC is defined as Co-monomer Distribution Index divided by Co-monomer Distribution Shape Factor multiplying by 100 (Equation 1)

$$CDC = \frac{\text{Comonomer Distrubution Index}}{\text{Comonomer Distribution Shape Factor}} = \frac{\text{Comonomer Distribution Index}}{\text{Half Width}/Stdev} * 100 \quad \text{Equation 1}$$

Co-monomer distribution index stands for the total weight fraction of polymer chains with the co-monomer content ranging from 0.5 of median co-monomer content (Cmedian) and 1.5 of Cmedian from 35.0 to 119.0° C. Co-monomer Distribution Shape Factor is defined as a ratio of the half width of co-monomer distribution profile divided by the standard deviation of co-monomer distribution profile from the peak temperature ($T_p$).

CDC is calculated according to the following steps: Obtain weight fraction at each temperature (T) ($w_T(T)$) from 35.0° C. to 119.0° C. with a temperature step of 0.200° C. from CEF according Equation 2.

Calculate the mean temperature ($T_{mean}$) at cumulative weight fraction of 0.500  (Equation 3)

Calculate the corresponding median co-monomer content in mole % (Cmedian) at the median temperature ($T_{median}$) by using co-monomer content calibration curve  (Equation 4).

(3i). Co-monomer content calibration curve is constructed by using a series of reference materials with known amount of co-monomer content. Eleven reference materials with narrow co-monomer distribution (mono modal co-monomer distribution in CEF from 35.0 to 119.0° C.) with weight average Mw of 35,000 to 115,000 (by conventional GPC) at a co-monomer content ranging from 0.0 mole % to 7.0 mole % are analyzed with CEF at the same experimental conditions specified in CEF experimental sections.

(3ii). Co-monomer content calibration is calculated by using the peak temperature ($T_p$) of each reference material and its co-monomer content. The calibration is: $R^2$ is the correlation constant.

Tan Delta

Tan delta was calculated from G' and G'' as follows:

$$\text{Tan } \delta = G''/G'$$

EXAMPLES

The present invention will be described in further detail with reference to the examples and comparative examples shown below:

| Property | Inventive Example | Comparative Example 1 (PT7009) | Comparative Example 2 (ASPUN ™ 6834) | Comparative Example 3 (DOWLEX ™ 2045) | Comparative Example 4 (ATTANE ™ 4606G) |
|---|---|---|---|---|---|
| MI | 15.0 | 8.7 | 17.0 | 1.0 | 3.0 |
| Density | 0.920 | 0.918 | 0.950 | 0.920 | 0.912 |
| Tan delta at 0.1 rad/s | 24.4 | 8.0 | 44.20 | 8.61 | 24.71 |
| Eta at 0.1 rad/s (Poise) | 968 | 1836 | 424 | 9352 | 2692 |
| Eta at 100 rad/s (Poise) | 225 | 255 | 263 | 1654 | 900 |
| CDC | 64.7 | 114.5 | 82.8 | 43.8 | 37.8 |
| Tp (Peak recrystallization temp) ° C. (From DSC) | 97 | 95 | 115 | 105 | 100 |
| Fiber Spinning | Excellent | Medium | Excellent | Good | Good |
| Fibers Stickiness | Low | Low | Low | High | High |
| Bonding to substrate | Excellent at low temp | low | AT high Temp | low | low |
| Airlaid process | Good | Difficult | Good | low | low |
| Fiber Texturizing | Good | Medium | Good | Difficult | Difficult |

Co-monomer Distribution Index is the total weight fraction with a co-monomer content ranging from $0.5*C_{median}$ to $1.5*C_{median}$. If $T_{median}$ is higher than 98.0° C., Co-monomer Distribution Index is defined as 0.95.

Maximum peak height is obtained from CEF co-monomer distribution profile by searching each data point for the highest peak from 35.0° C. to 119.0° C. (if the two peaks are identical then the lower temperature peak is selected) Half width is defined as the temperature difference between the front temperature and the rear temperature at the half of the maximum peak height. The front temperature at the half of the maximum peak is searched forward from 35.0° C., while the rear temperature at the half of the maximum peak is searched backward from 119.0° C.

In the case of a well defined bimodal distribution where the difference in the peak temperatures being equal to or larger than 1.1 times of the sum of half width of each peak, the half-width of the polymer is calculated as the arithmetic average of the half width of each peak.

The standard deviation of temperature (Stdev) is calculated according Equation 5:

$$Stdev = \sqrt{\sum_{35.0}^{119.0} (T - T_p)^2 * w_T(T)} \quad \text{Equation 5}$$

Figure 1:
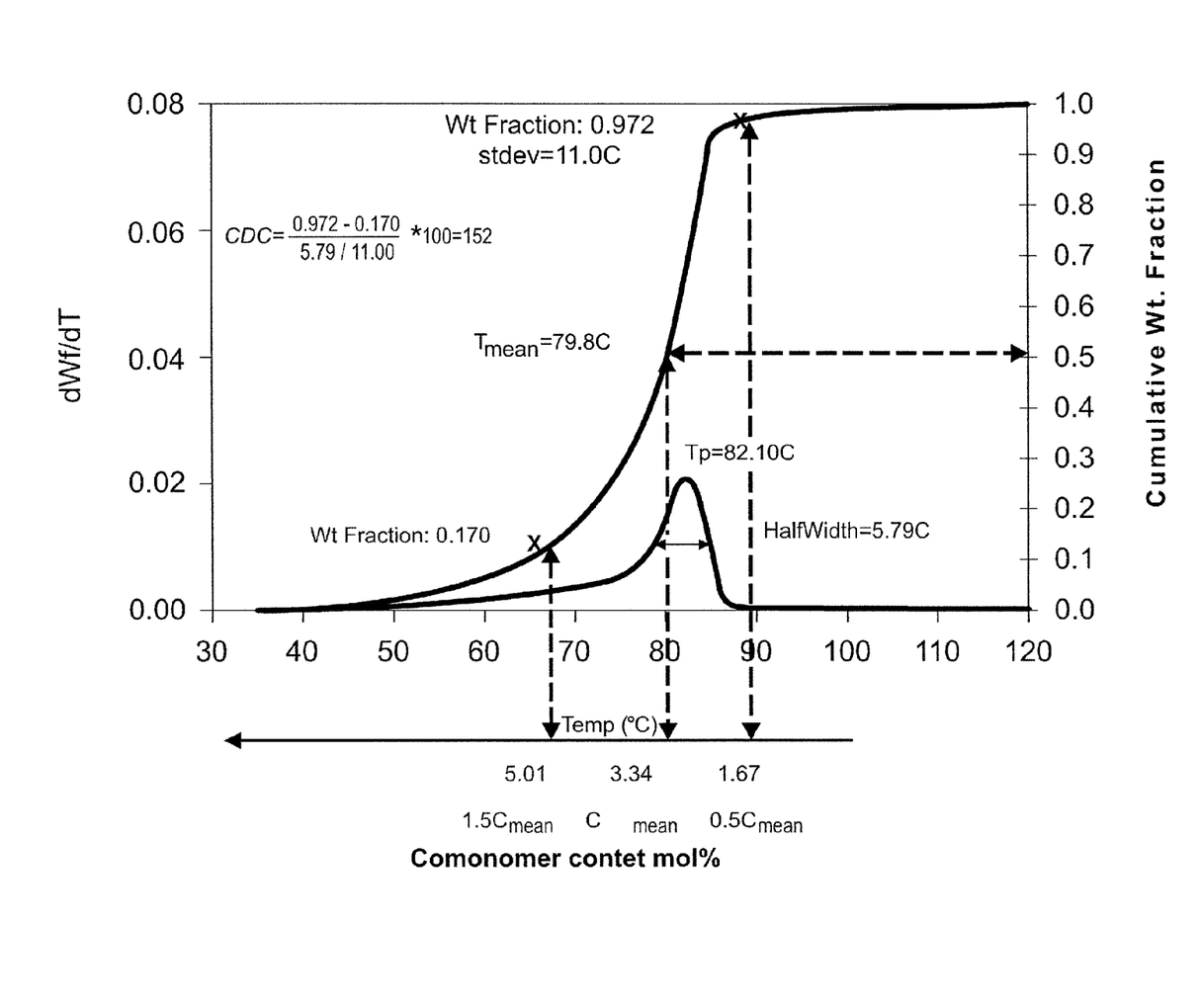
FIG. 1 is a graph illustrating dW/dT as a function of Temperature (° C.) and Cumulative Wt. Fraction as a function of Comonomer Content (mol %).

An example of co-monomer distribution profile is shown in FIG. 1.

Schematic drawings for obtaining peak temperature, half width and median temperature from CEF.

Complex Viscosity (Use Dynamic Melt Viscosity) also known as Eta:

The dynamic melt viscosity was calculated from DMS measurements between 0.1 Radians/sec to 100 Radians/sec as outlined in section on DMS.

In general for this application, a series of performance attributes are needed. First of all, the resin must be capable of forming a fiber in molten state at economically viable rates. Secondly, the resin must be sufficiently good at forming a good bonding onto the core fiber.

Third, the resin must have a low enough melting point for good airlaid process as well as for thermal air bonding to other substrates like cellulose.

If the $T_p$ is too high, airlaid process is compromised as well as poor thermal air bonding properties. If $T_p$ is too low, then sticking of fibers becomes an issue.

In fact, a relatively narrow melting range is ideal.

The inventive example in Table 1 is made with the following specific parameters of reaction:

In a two zone tubular high pressure free radical polymerization reactor all of the ethylene is fed into the first zone at a pressure of 2470 bars. A mixture of 14.1% tertiary butyl peroxy octoate (by weight) and 2.8% ditertiary butyl peroxide (by weight) is fed into the first zone of the reacor in an inert solvent typically used for such mixtures. The first zone initiation temperature is 136° C. and the peak temperature of the first zone is 310° C. Also to the first zone of the reactor, a mixture of methyl ethyl ketone of 1280 volume ppm and propylene of 2.1 volume % in an inert solvent is added. To the second reaction zone a mixture of 7% (by volume) tertiary butyl peroxyoctoate and 7% (by volume) ditertiary butyl peroxide is added, dissolved in an inert solvent. No chain transfer addition to second reaction zone is done. The inlet temperature to the second reaction zone is 194° C. and the peak temperature for the second zone is 317° C. The total conversion of ethylene at the outlet of the reactor is 28.7% based on the total ethylene fed at the start of reaction zone 1. The polymer is then devolatilized to remove unreacted ethylene, inert solvents and other impurities and then pelletized. The pellets are used as-is without further modification.

This material forms the polyethylene-based resin (A) used in the bicomponent fibers according to the instant invention. Since such resin (A) is most important, the properties have been investigated in the form of fibers made only from such resin (A).

Comparative example 1 is a low density polyethylene resin commercially available from The Dow Chemical Company as LDPE PT7009.

Comparative example 2 is a Ziegler Natta based High Density Polyethylene (HDPE) commercially available as ASPUN™ 6934 resin, also from The Dow Chemical Company.

Comparative Example 3 is a Ziegler Natta linear low density polyethylene resin (LLDPE) commercially available from The Dow Chemical Company as DOWLEX™ 2045 resin.

Comparative Example 4 is a Ziegler Natta ultra low density linear low density polyethylene resin (ULLDPE) commercially available from the Dow Chemical Company as ATTANE™ 4606 resin.

It was found that only comparative examples 1, 2 and the inventive example could be made into fibers satisfactorily. While comparative example 2 was good in fiber forming due to its high recrystallization temperature it did not bond well to fibers at desirable low temperatures. Adequate bonding of this comparative example could only be made at higher temperatures. Comparative examples 3 and 4 were not adequate in fiber forming as their eta 0.1 and eta 100 values were too high for high speed economical fiber forming.

While Comparative example 1 was satisfactory in terms of fiber forming, airlaid process as well as heated air bonding, it was inferior to inventive example in texturizing. It was observed that it did not bond well to the substrate fiber. It was surprisingly found that a good bonding to the substrate fiber requires that the ratio of G" and G' (tan delta) must be in a certain range. If tan delta is too low then the sheathing resin is too elastic and does not provide good bonding, as was the case with comparative example 1. If tan delta is too high then the sheating resin is not elastic enough to make a good bonding to the substrate fiber. Without good bonding between the sheating resin and the substrate fiber no adequate texturizing is obtained.

Additionally, we found that if a resin has a CDC value less than 45, sticking of fibers takes place at a given peak recrystallization temperature.

We claim:

1. A bicomponent fiber composed of a polyethylene-based resin (A) and a high-melting point resin (B) whose melting point is higher than that of the above polyethylene-based resin (A) by at least 10° C., the component ratio by weight of the polyethylene-based resin (A) to the high-melting point resin (B) being in the range of 50/50 to 10/90, and the polyethylene-based resin (A) forming at least part of the surface of the fiber longitudinally continuously wherein the polyethylene-based resin (A) is characterized by a Co-monomer Distribution Constant greater than about 45, a recrystallization temperature between 85° C. and 110° C., a tan delta value at 0.1 rad/sec from about 15 to 50, and a complex viscosity at 0.1 rad/second of 1400 Pa.sec or less, and a reaction producing the polyethylene-based resin (A) being initiated with a mixture of peroxides and the chain transfer agent being a mixture of methyl ethyl ketone and propylene.

2. The bicomponent fiber as claimed in claim 1, wherein the fiber is a core-sheath-type bicomponent fiber, and/or a side-by-side-type bicomponent fiber.

3. The bicomponent fiber as claimed in claim 1, wherein the polyethylene-based resin (A) has a single differential scanning calorimetry (DSC) melting peak within the temperature range from 85° C. to 110° C.

4. The bicomponent fiber as claimed in claim 1, wherein the polyethylene-based resin (A) has a Co-monomer Distribution Constant in a range of 45 to 400.

5. The bicomponent fiber as claimed in claim 1, wherein the polyethylene-based resin (A) has a Co-monomer Distribution Constant in the range of 50 to 100.

6. The bicomponent fiber as claimed in claim 1, wherein the polyethylene-based resin (A) has a melt index (measured in accordance with ASTM D 1238, Condition 190° C./2.16 kg) in the range of from 5 to 25g/10 min.

7. The bicomponent fiber as claimed in claim 1, wherein the polyethylene-based resin (A) has a density in the range of from 0.910 to 0.930 g/cm$^3$.

8. The bicomponent fiber as claimed in claim 1, wherein the polyethylene-based resin (A) has a peak recrystallization temperature in the range of from 90° C. to 105° C.

9. The bicomponent fiber as claimed in claim 1, wherein the polyethylene-based resin (A) having more than about 0.2 long chain branches/1000 carbons.

10. The bicomponent fiber as claimed in claim 1, wherein the polyethylene-based resin (A) having a complex viscosity at 0.1 rad/second of 1400 Pa.sec or less, and at 100 rad/seconds of 500 Pa.sec or less.

11. The bicomponent fiber as claimed in claim 1, wherein the polyethylene-based resin (A) having a complex viscosity at 0.1 rad/second in the range of 500 to 1200 and at 100 rad/seconds in the range of from 150 to 450 Pa.sec.

12. The bicomponent fiber as claimed in claim 1, wherein the polyethylene-based resin (A) having a Tan delta value at 0.1 rad/sec from about 15 to 40.

13. The bicomponent fiber as claimed in claim 1, wherein the high-melting point resin (B) having a melting point higher than that of the above polyethylene-based resin (A) by at least 20° C.

14. The bicomponent fiber as claimed in claim 1, wherein the high-melting point resin (B) is a polyolefin, a polyester resins, or a polyamide resins.

15. The bicomponent fiber as claimed in claim 1, wherein the polyethylene-based resin (A) and/or the high-melting point resin (B) contain additives selected from the group consisting of coloring material, thermoresistance stabilizer, lubricant, nucleating agent and adhesion promoters.

16. The bicomponent fiber as claimed in claim 15, wherein the adhesion promoter is maleic acids (MSA) or maleic acid anhydride (MAH), in amounts from 0.05 to 3% by weight.

17. The bicomponent fiber as claimed in claim 1, wherein the titer is from 0.7 to 20 dtex.

18. The bicomponent fiber as claimed in claim 1, wherein the fiber is a staple fiber having a length from 0.2 cm to 15 cm.

19. The bicomponent fiber as claimed in claim 1, wherein the fiber is texturized with a crimp contraction (K1) from 3 to 7% and a number of crimps from 3 to 6 crimps/cm.

20. The bicomponent fiber as claimed in claim 1, wherein the fiber is texturized with a crimp contraction (K1) from 8 to 15% and a number of crimps from 5 to 8 crimps/cm.

21. A nonwoven comprising the bicomponent fiber as claimed in claim 1.

22. The nonwoven as claimed in claim 21, wherein said nonwoven is a wet-laid nonwoven, air-laid nonwoven or carded nonwoven.

23. The nonwoven as claimed in claim 21, wherein said nonwoven contains other fibrous materials.

24. The nonwoven as claimed in claim 21, wherein said nonwoven having a basis weight from 10 to 500 g/m$^2$.

25. The nonwoven as claimed in claim 21, wherein said bicomponent fiber is a continuous fiber or a staple fibres.

26. The nonwoven as claimed in claim 21, wherein said nonwoven is a wet-laid nonwoven fabric and said bicomponent fiber being a non-texturized flat fiber having a length of from 0.2 cm to 3 cm.

27. The nonwoven as claimed in claim 21, wherein said nonwoven is a air-laid nonwoven fabric and said bicomponent fiber being texturized a crimp contraction (K1) from 3 to 7% and a number of crimps from 3 to 6 crimps/cm and having a length of from 0.2 cm to 3 cm.

28. The nonwoven as claimed in claim 21, wherein said nonwoven is a carded nonwoven fabric and said bicomponent fiber being texturized with a crimp contraction (K1) from 8 to 15% and a number of crimps from 5 to 8 crimps/cm, and having a length of from 2 cm to 15 cm.

29. The nonwoven as claimed in claim 21, wherein said nonwoven further comprises particle materials.

30. The nonwoven as claimed in claim 23, wherein said other fibrous material is a organic and/or inorganic fibrous materials.

31. The nonwoven as claimed in claim 30, wherein said organic fibrous material comprises beside organic polymer resins also natural fibrous materials.

32. The nonwoven as claimed in claim 31, wherein said organic polymer resins is a melt-spinnable materials.

33. The nonwoven as claimed in claim 29, wherein said particle material is an inorganic particle materials.

34. The nonwoven as claimed in claim 30, wherein said inorganic fibrous material is based on glass and/or minerals.

35. The nonwoven as claimed in claim 30, wherein said organic fibrous material is based on cellulose, cotton, homo- and copolymers based on polyethylene or polypropylene.

36. The nonwoven as claimed in claim 29, wherein said particle materials being super absorber materials.

37. The nonwoven as claimed in claim 33, wherein said inorganic particle material is a grinding material.

* * * * *